US011586595B1

(12) United States Patent
Shams et al.

(10) Patent No.: US 11,586,595 B1
(45) Date of Patent: Feb. 21, 2023

(54) SPACE-EFFICIENT TECHNIQUES FOR GENERATING UNIQUE INSTANCES OF DATA OBJECTS

(71) Applicant: Amazon Technologies, Inc., Seattle, WA (US)

(72) Inventors: Khawaja Salman Shams, Portland, OR (US); Ryan Farris, Bellevue, WA (US); Benjamin Aldouby Schwartz, Baltimore, MD (US); David Dunlap, Seattle, WA (US); Andrew Kent Warfield, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 308 days.

(21) Appl. No.: 16/457,595

(22) Filed: Jun. 28, 2019

Related U.S. Application Data

(60) Provisional application No. 62/791,588, filed on Jan. 11, 2019.

(51) Int. Cl.
*G06F 16/182* (2019.01)
*G06F 16/18* (2019.01)
*H04L 67/1097* (2022.01)

(52) U.S. Cl.
CPC ........ *G06F 16/1873* (2019.01); *G06F 16/182* (2019.01); *H04L 67/1097* (2013.01)

(58) Field of Classification Search
CPC . G06F 16/1873; G06F 16/182; H04L 67/1097
See application file for complete search history.

(56) References Cited

U.S. PATENT DOCUMENTS

| | | | | |
|---|---|---|---|---|
| 5,414,455 A | * | 5/1995 | Hooper | H04N 7/17318 348/E7.071 |
| 5,996,015 A | * | 11/1999 | Day | H04L 29/06 348/E7.071 |
| 6,018,359 A | * | 1/2000 | Kermode | H04N 21/2381 348/E5.008 |
| 6,333,750 B1 | | 12/2001 | Odryna et al. | |
| 6,925,499 B1 | | 8/2005 | Chen et al. | |
| 7,058,809 B2 | | 6/2006 | White et al. | |

(Continued)

FOREIGN PATENT DOCUMENTS

EP 1134977 6/2000

OTHER PUBLICATIONS

AWS, "Amazon CloudFront—Developer Guide", API Version, Sep. 29, 2016, Updated May 24, 2019, pp. 1-426.

(Continued)

*Primary Examiner* — Alford W Kindred
*Assistant Examiner* — Tiffany Thuy Bui
(74) *Attorney, Agent, or Firm* — Robert C. Kowert; Kowert, Hood, Munyon, Rankin & Goetzel, P.C.

(57) ABSTRACT

A set of data units associated with a data object is obtained, such that respective instances of the data object can be reconstructed from respective subsets of the set. Corresponding to a request for the data object, a first subset of the set is identified. The first subset meets a uniqueness criterion with respect to other subsets of the set that are used to respond to other requests for the data object. An instance of the data object is reconstructed from the first subset.

20 Claims, 9 Drawing Sheets

(56) References Cited

U.S. PATENT DOCUMENTS

| | | | | |
|---|---|---|---|---|
| 7,143,433 | B1* | 11/2006 | Duan | H04N 21/23103 |
| | | | | 725/115 |
| 7,296,180 | B1* | 11/2007 | Waterhouse | G06F 11/1076 |
| | | | | 714/2 |
| 7,340,505 | B2 | 3/2008 | Lisiecki et al. | |
| 7,734,643 | B1* | 6/2010 | Waterhouse | G06F 16/10 |
| | | | | 707/770 |
| 9,672,110 | B1* | 6/2017 | Patel | G06F 11/1076 |
| 10,198,319 | B1* | 2/2019 | Sieklucki | G06F 11/1076 |
| 2013/0339818 | A1* | 12/2013 | Baker | G06F 11/10 |
| | | | | 714/763 |
| 2014/0172930 | A1* | 6/2014 | Molaro | H04L 67/1097 |
| | | | | 707/827 |
| 2015/0082349 | A1* | 3/2015 | Ishtiaq | H04N 21/4884 |
| | | | | 725/40 |
| 2015/0319204 | A1* | 11/2015 | You | H04L 45/74 |
| | | | | 709/231 |
| 2016/0154963 | A1* | 6/2016 | Kumar | G06F 21/602 |
| | | | | 713/189 |
| 2019/0312933 | A1* | 10/2019 | Richards | G06F 16/24552 |

OTHER PUBLICATIONS

Wikipedia, "Linear network coding", Retrieved from https://en.wikipedia.org/wiki/Linear_network_coding#Applications on Jun. 8, 2019. pp. 1-7.

Wikipedia, "Mojette Transform", Retrieved from https://en.wikipedia.org/wiki/Mojette_Transform on Jun. 8, 2019, pp. 1-9.

Wikipedia, "Reed-Solomon error correction", Retrieved from https://en.wikipedia.org/wiki/Reed-Solomon_error_correction on Jun. 8, 2019, Pagers 1-29.

* cited by examiner

10:15 coding scheme example

Shard (GDU) set 450:
| IS 411A | IS 411B | IS 411C | IS 411D | IS 411E | IS 411F | IS 411G | IS 411H | IS 411I | IS 411J | PS 412A | PS 412B | PS 412C | PS 412D | PS 412E |

ID 420A (unsigned integer 1023): 0, 0, 0, 0, 0, 1, 1, 1, 1, 1, 1, 1, 1, 1, 1

ID 420B (unsigned integer 1535): 0, 0, 0, 0, 1, 0, 1, 1, 1, 1, 1, 1, 1, 1, 1

ID 420C (unsigned integer 1791): 0, 0, 0, 0, 1, 1, 0, 1, 1, 1, 1, 1, 1, 1, 1

SPACE-EFFICIENT TECHNIQUES FOR GENERATING UNIQUE INSTANCES OF DATA OBJECTS

This application claims benefit of priority to U.S. Provisional Application No. 62/791,588 filed Jan. 11, 2019, titled "Space-efficient techniques for generating unique instances of data objects," which is hereby incorporated by reference in its entirety.

BACKGROUND

Many data management tasks that were originally performed using in-house resources of various business entities are being migrated to provider networks such as cloud-based environments. For example, producers and distributors of various types of content can now take advantage of the affordability, scalability, durability, and availability offered by provider network services. As more and more data objects are stored using provider network resources, and distributed to large numbers of (e.g., millions of) end-users from the provider networks, non-trivial tradeoffs may have to be made between the sharing and isolation of individual data objects. Such tradeoffs may, for example, involve decisions regarding how many distinct copies of data objects are to be stored, where such copies are to be located physically to achieve desired levels of throughput and availability, how (or whether) to subdivide individual data objects for storage, how to decide which particular copy or version of a data object is to be provided to a given content consumer, and so on.

BRIEF DESCRIPTION OF DRAWINGS

FIG. 4 illustrates an example 10:15 coding scheme which may be used for reconstituting a data object, according to at least some embodiments.

Figure 1:
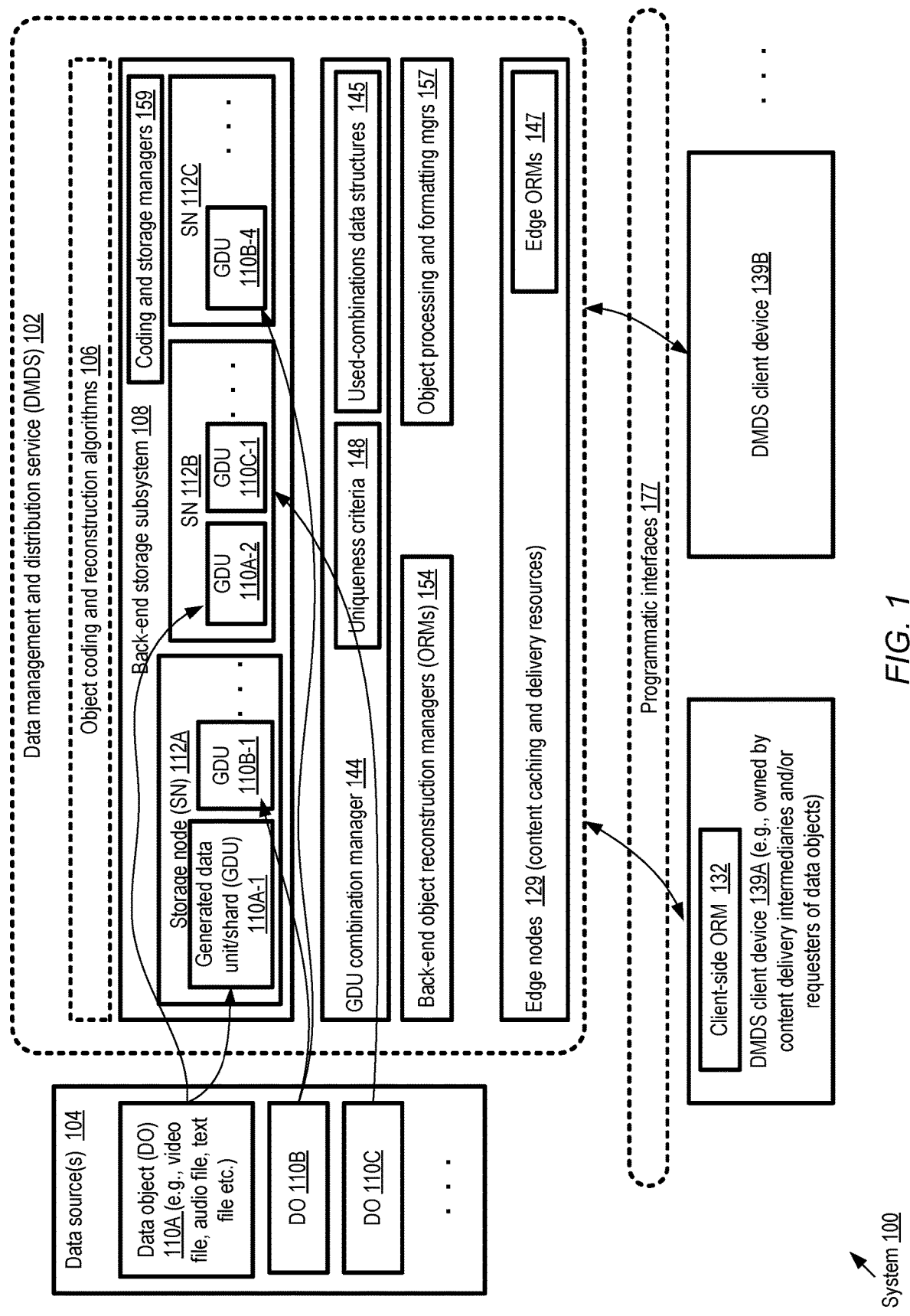
FIG. 1 illustrates an example system environment in which space-efficient techniques for generating unique instances of data objects may be implemented, according to at least some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

Various embodiments of methods and apparatus for implementing space-efficient techniques for generating and distributing unique instances or versions of data objects are described. A service or system for storing and/or distributing data objects such as videos, audio, and the like may have to handle requests from a large number (e.g., millions) of data consumers, with wide variations in the sizes of individual data objects, the popularity of the data objects (e.g., the rate of requests received for some objects may be much higher than the rates for other objects), the geographical and temporal distribution of requests, and so on. The performance requirements placed on the delivery of data objects may often be quite stringent, even in scenarios in which large numbers of data consumers wish to access the same data object near-concurrently. In addition, in at least some embodiments, for some types of content delivery applications and some classes of data objects, uniqueness requirements or constraints may also apply—e.g., a single copy of a given data object may only be sharable among a small number of consumers, or by a single consumer. In various embodiments, in order to meet the performance, availability, and uniqueness-related requirements of such applications, techniques in which individual instances of data objects are generated using combinations of smaller data units derived from the original data objects may be implemented.

According to at least some embodiments, with respect to a given data object (or a collection of objects) such as a video file, an audio file or a text file, a number of parameters to be used to generate a plurality of smaller data units, such that a subset of the generated data units can be used to reconstruct an instance of the original data object, may be determined at one or more computing devices of data management and distribution system. Such parameters may include, for example, a coding algorithm (e.g., similar to Reed-Solomon encoding, parity-based encoding techniques and the like), the number of data units into which the original data object is to be split, the number of data units that are to be obtained by applying a transformation function or functions to the original data object's subdivided units (or to the original data object as a whole), the number of data units that are required to reconstitute an instance or copy of the original data object, and so on in various embodiments. The generated data units (GDUs) obtained from the data object may be referred to as shards, data segments, or data sections in some embodiments. The reconstituted data objects that can be obtained from the subsets of GDUs may be referred to as instances, versions or copies of the original data objects in various embodiments. The set of GDUs derived from the data object may be stored at one or more storage devices, e.g., with individual ones of the storage devices or storage nodes being used for one or more GDUs of one or more data objects in various embodiments.

In at least some embodiments, as indicated above, one of the objectives of the storage system or service being used may include enforcing uniqueness constraints with regard to the instances of data objects that are provided to the system's clients. For example, some types of applications may require respective unique copies or instances of a given data object to be provided to each requester or consumer of the data object, other types of applications may permit only up to a small number of consumers (e.g., no more than C consumers, where C is a small integer) to share a given instance, and so on. Fingerprints, digital signatures or watermarks indicating the uniqueness of the instances of the data objects provided to consumers may be generated and/or retained at the provider in some embodiments. In one embodiment, each instance of a data object may be provided to a requester with metadata such as a watermark, digital signature or fingerprint identifying the instance; such watermarks, signatures or fingerprints may be compared across different instances if needed to verify uniqueness of the instances. The parameters used for generating the GDUs may be selected in such a way in various embodiments that the number of possible distinct combinations of GDUs that can be used to reconstitute the data object may be quite high (e.g., it may be possible to use millions or billions of distinct subsets/combinations of GDUs), while the total storage required to store the GDUs may be quite low (e.g., a small multiple of the size of the original data object). As such, the instance uniqueness requirements of various applications may be met with a relatively low storage overhead in at least some embodiments. The assignment of the GDUs to requests for a data object may be managed in some embodiments such that the pool of all GDUs can be shared by requesters of the object (resulting in a significant cost savings with respect to storage), while two users never receive an instance of the data object reconstructed from the same set of GDUs (resulting in uniqueness). In various embodiments, the GDU-based techniques may also help in isolating the traffic of different data consumers (and thus preventing the work done at the service on behalf of one consumer from impacting the performance perceived by other consumers), especially in multi-tenant environments in which lots of consumers access the same object.

When a request for at least a portion of a given data object is received, in some embodiments a subset of the GDUs that satisfy the uniqueness criterion being enforced may be identified or selected. For example, in a scenario where each request is to be fulfilled using a different subset, the system may ensure that the particular subset Sj of GDUs from which the requested data object is reconstituted for a given request Rj is different from any of the subsets {Si} that have been used to fulfill other requests {Ri}. Any of a number of techniques may be used in different embodiments to satisfy the uniqueness requirements—e.g., a counter that generates a new (as-yet-unused) combination of GDUs for each request may be used in one embodiment, a data structure which stores records of the combinations/subsets that have not yet been generated may be used in other embodiments, and so on. The task of determining which particular subset of GDUs should be used to respond to a particular request may be termed subset assignment, combination assignment, or simply assignment in some embodiments. In some embodiments, unique instances of the data object may be generated in a deterministic sequence. The sequence of subsets {S1, S2, S3, . . . } of GDUs that is going to be used for responding to successive requests for the data object may be determined in advance in such embodiments: e.g., for request #1, subset S1 may be used, for request #2, subset S2 may be used, and so on. The particular subsets that were used for respective requests or respective clients may be recorded in such embodiment, e.g., in an audit log or the equivalent. To handle near-simultaneous requests (which may originate from geographically distinct locations), in some embodiments a high performance data store (e.g., a key-value data store that uses optimistic concurrency control) may be used to quickly generate records of the subsets that have been used. In another approach which may be employed in some embodiments, individual users of a service that is providing access to the data object may be assigned a respective subset or combination of GDUs of the data object, so a user-ID based lookup may be used to identify the subset to be used for a given request for the data object. At least in some embodiments, the contents of the instances of the data object that are provided in response to respective requests might be identical in terms of results of a bit-wise comparison, but the instances may be unique in how they were constructed from different combinations of GDUs.

In at least one embodiment, a requester may specify, in a given request, a particular preferred combination of GDUs to be used to fulfil the request. Records of the particular combinations or GDU subsets that are used to respond to individual requests (or individual requesters/consumers) may be maintained in some embodiments as mentioned above, e.g., to enable tracking/logging of the specific data object instances provided to different requesters. After the appropriate subset of GDUs to be used for a particular request has been identified in accordance with the applicable uniqueness requirements, an instance of the requested data object (or requested portion of the data object) may be reconstructed using that subset, and provided to one or more destinations in various embodiments. One or more of the storage devices at which the GDUs were stored may be accessed to assemble the subset needed for the response. Shuffle-sharding techniques may be used in some embodiments, e.g., in multi-tenant environments, to select the particular combination of GDUs to be used for a given requester or a given request.

In addition to satisfying the uniqueness requirements, a number of performance-related optimizations may also be instituted using the GDUs in different embodiments. For example, at least some GDUs of a given data object may be cached and/or the data object may be reconstituted from GDUs at edge devices located closer to the consumers of the objects than the centralized storage systems of the data management service in one embodiment. In at least one embodiment, the set of data object accessors that are expected to request a given data object from a given edge location or device may be identified, and at least a subset of the particular GDU subsets assigned to those accessors may be cached or stored at an edge device. In some embodiments, GDUs may be cached/reconstituted at client-side devices belonging to the consumers of the data objects. In some embodiments, new subsets/combinations of GDUs that are needed to enforce uniqueness constraints may be identified using late binding (e.g., only when a consumer actually requests a data object, rather than in anticipation of a possible request). In at least some embodiments, e.g., in order to handle larger number of consumers of a particular popular data object, more GDUs may be rapidly generated and stored dynamically as demand increases, thereby expanding the pool of available unused GDU combinations. For example, initially a relatively small number of GDUs may be stored for a given data object, with more GDUs being added if and when the demand for the data object increases. In some embodiments, for some types of data objects, only copies of untransformed segments of the original data object may be used as GDUs, such that the original data object can be obtained by concatenating a selected combination of untransformed segments in the correct order. In other embodiments, only derived/transformed GDUs may be used (e.g., such that none of the GDUs used for reconstituting an object comprises a bit sequence exactly matching a bit sequence of the original object, and so concatenation cannot be used to reconstitute the original data object). In yet other embodiments, both untransformed and derived GDUs may be utilized. In some embodiments, the GDU-based approach towards providing instances of data objects may be used to help achieve other objectives, such as the logical or physical isolation of the GDUs used on behalf of individual customers. For example, some GDUs may be stored on a selected set of storage devices and/or in selected data centers, and used to respond only to requests from a particular customer/client.

As one skilled in the art will appreciate in light of this disclosure, certain embodiments may be capable of achieving various advantages, including some or all of the following: (a) substantially reducing the storage overhead required to satisfy uniqueness requirements of applications for distributing content such as video, audio or text, relative for example to techniques in which providing a unique instance of the data object to a content consumer requires storing an entire copy of the instance; (b) improving the throughput and availability of content delivery applications, e.g., by caching appropriately selected generated data units at edge devices of a provider network and/or at client-side devices, as well as by selecting GDUs for a request based on geographical locality and/or (c) preventing/avoiding scenarios in which clients of a content distribution system can interfere with the performance achieved by other clients (e.g., scenarios similar to distributed denial of service (DDoS) may be avoided by distributing large numbers of GDUs across numerous storage devices). The techniques described may also be beneficial in live streaming applications—e.g., an edge node or location that is to provide streaming data to a consumer may make requests for multiple subsets of GDUs to a back end storage subsystem, and provide the content using the subset that is received first at the edge node/location. Such an approach may help reduce latencies (e.g., P99.9 latencies) that may otherwise be affected by contention at the back end. In some embodiments, combinations of identifiers of GDUs may be used in a manifest used for streamed data to create unique streams at the application level. A number of applications, including for example virtualized or cloud-based digital video/audio recording applications, may benefit from the techniques in various embodiments.

Example System Environment

FIG. 1 illustrates an example system environment in which space-efficient techniques for generating unique instances of data objects may be implemented, according to at least some embodiments. As shown, system 100 comprises resources and artifacts of a data management and distribution service (DMDS) 102, as well as one or more data sources 104 in the depicted embodiment. The DMDS 102 may comprise, for example, a back-end storage subsystem 108 comprises one or more storage nodes (SNs) 112, such as SN 112A, 112B and 112C. Individual ones of the SNs 112 may comprise one or more storage devices at which generated data units (GDUs) or shards of various data objects 110 may be stored. One or more object coding and reconstruction algorithms 106 may be employed at the DMDS 102 in the depicted embodiment, e.g., to produce a respective set of GDUs corresponding to individual data objects 110 obtained from one or more data sources 104, such that an instance, version or copy of a data object 110 can be reconstructed from a subset of the GDUs of that object. In some embodiments, for example, a variant of Reed-Solomon encoding (or other erasure coding algorithms) may be used, while in other embodiments XOR-style codes (similar to those used in RAID (Redundant Array of Independent Disks) storage systems), network coding algorithms, algorithms similar to those used for Mojette transforms, Clay codes or the like may be employed. The specific manner in which an instance of the original data object is obtained from a subset of GDUs may vary in different embodiments—e.g., in some cases the GDUs of a subset may be concatenated prior to applying a transformation function, in other cased individual GDUs may be transformed separately prior to assembling the results of the transforms, and so on. In at least some embodiment, at least some of the GDUs that can be used to reconstitute a given data object 110 may not have been generated by applying a function that modifies the original data—e.g., segments/sections of the unmodified data object may be used as one or more of the GDUs.

A wide variety of categories of data objects may be stored and distributed to clients of the DMDS 102 in different embodiments. For example, individual ones of the data objects 110 (such as DO 110A, 110B or 110C) may comprise video files, audio files, text files, documents, and so on, which may for example be stored in a repository (which represents one example of a data source 104) of a content producer. In some embodiments, at least some data objects (such as audio or video objects) may be captured and streamed in real time to the DMDS 102 (and/or to consumers from the DMDS). The sizes of the data objects may vary substantially in some embodiments—e.g., some objects may be tens or hundreds of gigabytes in size, others may be only a few megabytes or a few kilobytes. Furthermore, the popularity of different data objects may also vary widely in at least some embodiments—some videos may be requested by millions of clients of the DMDS 102, while others may be requested by no more than a few clients. A number of parameters and meta-parameters may be selected for extracting GDUs from a given type of data object or from a given data object at the DMDS in the depicted embodiment. Meta-parameters may for example include the particular coding/reconstruction algorithm to be used, the desired level of availability and data durability, geographical distribution requirements, and so on. Parameters may include the number and types (e.g., original segments or derived/transformed segments) of GDUs to be generated for a given data object. In some embodiments, clients on whose behalf the data objects are being stored (e.g., a video streaming service which uses the DMDS to manage its catalog of films, television shows and the like) may indicate the parameters and/or meta-parameters to be used for at least a subset of the data objects. A set of default parameters may be used at least initially for encoding and storing GDUs of some types of data items in one embodiment—e.g., for all data objects of a size greater than G gigabytes, a particular set of parameters/meta-parameters P1 may be used, while for all data objects of a size less than or equal to G gigabytes, a different set of parameters/meta-parameters P2 may be used.

Based on the selected parameters and meta-parameters, a respective set of one or more GDUs may be constructed from a given DO 110 in the depicted embodiment, and stored at one or more of the storage nodes 112. For example, GDUs 110A-1 and 110A-2, corresponding to DO 110A, may be stored at SNs 112A and 112B respectively. Similarly, from DO 110B, GDUs 110B-1 and 110B-2 may be obtained and stored at SNs 112A and 112C respectively, while GDU 110C-1 (extracted/derived from DO 110C) may be stored at SN 110C-1 in the depicted example scenario. In some embodiments, one or more coding and storage managers 159, each implemented at one or more computing devices, may be responsible for selecting, parameterizing and implementing the appropriate coding algorithm for a given data object 110, as well as for selecting the particular storage node at which individual ones of the GDUs are stored within the back-end storage subsystem 108. In at least some embodiments, in addition to a back-end storage subsystem 108 whose resources may be located at one or more centralized locations, a DMDS 102 may include a set of edge nodes 129. Such edge nodes may include computing devices that are located physically closer to DMDS client devices 139 (e.g., at geographically distributed, and often smaller, premises than data centers typically set up in the centralized locations), from which requests for data objects are received, than the devices of the back-end storage subsystems at the centralized locations. Such edge nodes may comprise resources used for caching GDUs of at least some data objects (e.g., objects that are expected to be more popular than others among data object consumers) and delivering instances of the data objects to clients of the DMDS. In some embodiments, coding and storage managers 159 may also direct some GDUs (or replicas of GDUs) to the edge nodes. In at least one embodiment, resources at an edge node may send requests to the coding and storage managers to provide replicas of GDUs of one or more data objects for caching.

The DMDS may implement one or more programmatic interfaces 177 in the depicted embodiment, which may be used by clients to submit requests (e.g., to obtain data object instances, to indicate configuration settings for various data objects, and so on) and receive responses to the requests. Programmatic interfaces 177 may, for example, include a set of application programming interfaces (APIs), web-based consoles, command-line tools, graphical user interfaces and the like in various embodiments. The interfaces 177 may be utilized from any of a variety of DMDS client devices 139 (e.g., 139A or 139B), such as desktop or laptop computer systems, tablets, smart phones, wearable devices and the like. Note that the DMDS may be used by at least two types of clients in some embodiments—content delivery intermediaries (such as video streaming services) as well as the end users who wish to view the instances of data objects. In some embodiments, the intermediaries may represent direct clients of the DMDS, while the end users may be clients of the intermediaries (and as such, the end users may be considered indirect clients of the DMDS).

In some embodiments, the instances of a given data object 110 that is to be provided to a requesting DMDS client (either a direct client or an indirect client) may have to satisfy one or more uniqueness criteria 148. In one embodiment, for example, for each client of the DMDS that submits a programmatic request for a given data object DOi, a unique combination of GDUs (i.e., a combination that has not been used for any other client or request, and is not expected to be used for any other client or request) may be identified. An instance of DOi may then be reconstructed from that unique combination of GDUs and provided to the requester in such an embodiment. In other embodiments, a more relaxed uniqueness requirement may be enforced for at least some data objects 110—e.g., up to a maximum of P requests or P requesters may be supplied with an instance reconstructed from a given combination of GDUs. In the embodiment depicted in FIG. 1, a GDU combination manager 144 (implemented at one or more computing devices) may be responsible for identifying the particular combination or subset of GDUs to be used to reconstruct a data object instance to respond to a given request in accordance with the applicable uniqueness criteria 148. In some embodiments, one or more data structures 145 may be used to store records of the available and/or no-longer available combinations of GDUs for at least some data objects, and/or to store records of the particular combinations of GDUs that were used to respond to a given request. As such, it may be possible in some embodiments to determine, after the fact, the particular combination of GDUs used for fulfilling individual ones of the requests for data objects. As discussed below, in various embodiments bit-map based identifiers (typically small integers) may be associated with respective GDU combinations, and such identifiers may be included in the data structures 145.

In some embodiments, object reconstruction managers (ORMs), such as back-end ORMS 154 implemented at one or more computing devices may be responsible for reconstituting the requested data object from a selected combination of GDUs. That is, in such embodiments, a GDU combination manager 144 may determine/identify the combination to be used, while an ORM may do the work of reconstructing the data object instance from that combination. In other embodiments, the tasks of identifying the GDU combination, and then reconstructing the objects, may be performed at the same computing device or devices. In at least some embodiments, one or more edge ORMs 147 may reconstruct a requested data object, e.g., either using locally cached GDUs of an edge device, or after obtaining the GDUs from the back-end storage subsystem. In one embodiment, a client's request for a data object may be received at an edge node 129, and the edge node may send one or more internal requests to the back-end storage subsystem 108 of the edge node does not have a locally cached combination of GDUs that meet the applicable uniqueness criteria. Several different requests, for respective GDU combinations that met the uniqueness criteria, may be sent to one or more storage nodes of the back end from the edge node in some implementations, and the response that is obtained fastest from the back end may be used to provide an instance of the requested data object to the client. In at least some embodiments, GDUs (rather than reconstructed data objects) may be supplied/transmitted to DMDS client devices, such as device 139A, and a client-side ORM 132 may reconstitute the desired object at the client-side device. In some embodiments, in a manner analogous to the way in which an edge node may send multiple requests for GDU combinations to the back end and use the fastest response, a client device 139 may also send multiple requests (to the edge node layer or to the back-end) and use the fastest response returned. In at least one embodiment, in addition to deriving GDUs and reconstructing the corresponding data objects when needed, other types of object processing (e.g., conversion of videos/ audios from one format to another, encryption, compression, etc.) may also be performed at the DMDS 102, e.g., by processing and formatting managers 157 implemented at one or more computing devices.

Overview of Example Coding Algorithm

Figure 2:
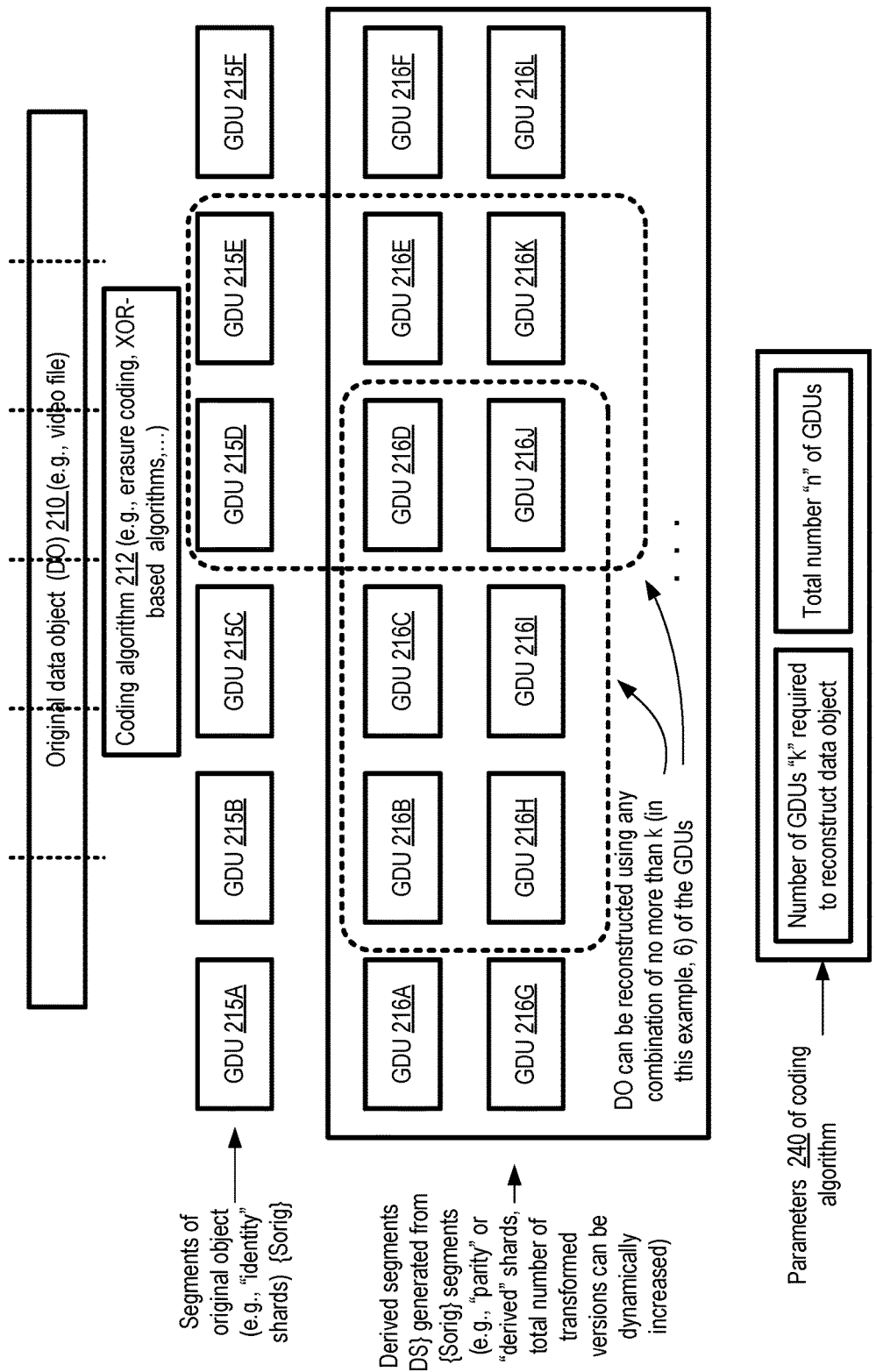
FIG. 2 illustrates a high-level view of an example coding algorithm which may be used to reconstruct a data object using any of numerous combinations of data units derived from the data object, according to at least some embodiments.

FIG. 2 illustrates a high-level view of an example coding algorithm which may be used to reconstruct a data object using any of numerous combinations of data units derived from the data object, according to at least some embodiments. In the depicted embodiment, in accordance with a coding algorithm 212, an original data object (DO) 210, such as a video file, may first be subdivided into some number of segments {Sorig}(the notation "orig" indicates that these segments are subdivisions of the original object). Such subdivisions of the original or source object may be referred to as "identity" shards or "identity" segments in some embodiments (as they may concatenated to produce the original data object). Then, some number of derived segments {DS} may be generated from {Sorig} (the computations used to generate them may vary from one coding algorithm to another). Individual members of {DS} may be referred to as "parity" or "derived" shards or segments in some embodiments. The logic of the algorithm 212 may ensure that an instance of the data object can be reconstructed using any combination of no more than "k" (in the depicted example, k=6) of the elements of the set comprising the union of {Sorig} and {DS}. As such, the elements of both {Sorig} and {DS} are GDUs (similar to the GDUs discussed in the context of FIG. 1) in the depicted embodiment. In FIG. 1, six GDUs 215A-215F of {Sorig} are shown, and twelve GDUs 216A-216L of {DS} are shown. By way of example, the 6-GDU combination {216B, 216C, 216D, 216H, 216I and 216J} comprising only derived GDUs, or the 6-GDU combination {215D, 215E, 216D, 216E, 216J and 216K comprising both original segments and derived GDUs} may be used to reconstitute an instance or copy of the original data object in the scenario depicted in FIG. 2 (numerous other combinations are of course also possible).

The parameters 240 for GDU generation may comprise the number of GDUs "k" that is required to reconstruct the data object, and the total number "n" of GDUs (the cardinality of {DS} plus the cardinality of {Sorig}). The total amount of storage used, assuming all GDUs are equal in size, is "n", representing an increase by a factor of "n"/"k". In at least some embodiments, the notation "k:n coding scheme" may be used to refer to such an algorithm 212 for GDU generation. As mentioned earlier, any of a variety of coding algorithms, any of which may be described using the k:n notation, may be employed in different embodiments, including variants of Reed-Solomon or other erasure coding algorithms, XOR (exclusive-OR) coding algorithms, network coding algorithms, Mojette algorithms, Clay codes, etc. In at least some embodiments, if needed to accommodate uniqueness constraints, additional derived GDUs (parity shards) may be generated dynamically—that is, the algorithm 212 may be flexible enough to support adaptation to increase the number of possible unique permutations/ combinations of GDUs that can be used to reconstruct the original data object. In at least some embodiments, not all the GDUs may necessarily be of the same size. Note also that in some embodiments, the parameter "k" need not necessarily equal the cardinality of {Sorig}. To simplify the presentation, in much of the remainder of this description, all the GDUs are assumed to be of the same size, and "k" is assumed to equal the cardinality of {Sorig}.

Because "k" is less than "n", in various embodiments it may be possible to reconstruct the original data object even if some number of GDUs (no greater than (n–k)) are lost, e.g., due to failures of storage devices and/or storage nodes. Using the parameters "n" and "k", in various embodiments coding schemes that trade off the amount of resilience to GDU loss ("n" being much larger than "k" is more resilient), the capacity overhead in terms of storage cost (this overhead is expressed as "n"/"k", and so lower overheads are achieved with "n" relatively close to "k"), and also the request amplification involved in reconstruction may be employed. This last component, request amplification, deals with the fact that reading and writing individual GDUs or shards may have a cost that increases with GDU count. For example, on some types of media (especially mechanical media such as disk or tape) a read or write operation may require mechanical movement that may turn out to be a scarce resource in the system. Accordingly, the values of one or both of "n" and "k" may be kept within selected bounds in order to avoid turning a single data object-level read or write into very large numbers of GDU level reads and writes in at least some embodiments.

In addition to the task of generating the GDUs using a selected coding scheme, a DMDS similar to DMDS 102 of FIG. 1 may also include components that are responsible for assigning identifiers to unique combinations of GDUs, as well as for assigning the unique combinations to individual requests for data objects in various embodiments. Additional details and examples of how these tasks may be performed in different embodiments are provided below, starting with a discussion of a pair of concrete examples of k:n coding schemes.

Coding Scheme Examples

Figure 3:
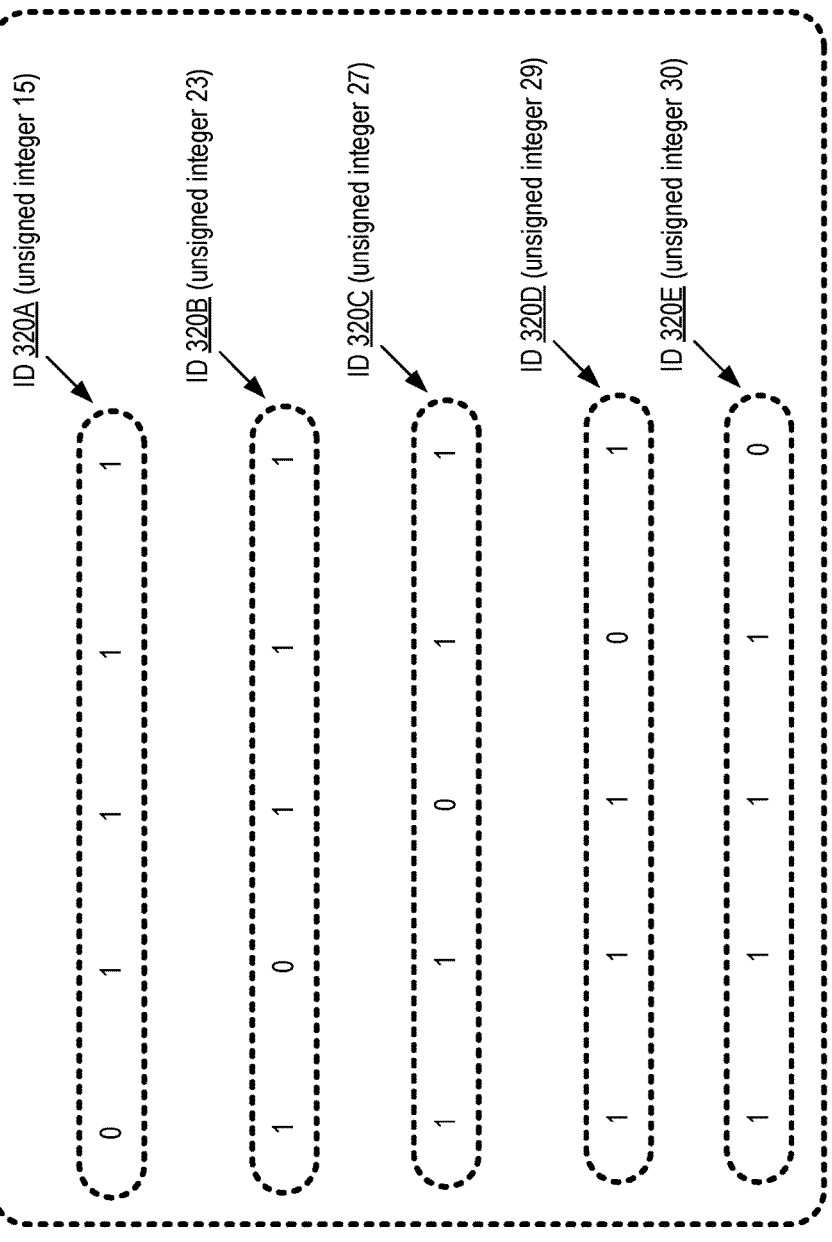
FIG. 3 illustrates an example 4:5 coding scheme which may be used for reconstituting a data object using unique combinations of shards derived from the data object, according to at least some embodiments.

FIG. 3 illustrates an example 4:5 coding scheme which may be used for reconstituting a data object using unique combinations of shards derived from the data object, according to at least some embodiments. In the depicted example, a shard set or GDU set 350 comprises four identity shards (ISs) 311A-311D of equal sizes, as well as a single parity shard (PS) 312. The original data object comprises the concatenation of ISs 311A-311D, and any combination of four of the five available GDUs may be used to reconstruct an instance or copy of the original data object. Respective bit positions or indexes [0, 1, 2, 3, 4] 313 are assigned to shards 311A, 311B, 311B, 311D and 312 for the purposes of generating unique identifiers for candidate GDU combinations that can be used for reconstruction. A "1" value in a particular bit position is used to indicate the presence of the corresponding shard in the depicted embodiment; in other embodiments, a "0" value may be used to indicate presence of a shard. The scheme shown in FIG. 3 is logically similar to a RAID-5 scheme used for enhancing resilience to storage device failures, in which a data object may be striped across five disks, with the raw data being placed across the first four disks and an XOR-based parity shard, calculated from the raw data shards, being stored on the fifth disk. In the baseline RAID-5 algorithm, the system is resilient to a loss of any single disk. Extensions of a baseline XOR-based technique similar to that of RAID-5 may be used in some embodiments, e.g., with multiple parity shards being generated for different subsets of identity shards to survive more failures. The storage overhead ratio is 1.25 (i.e., 5/4) in the example scenario shown in FIG. 3.

Bitmaps 310 may be generated to represent each of the different 4-GDU combinations that can be used to reconstruct the original data object in the depicted embodiment. The total number of unique viable 4-GDU subsets (which may be referred to as shard sets) can be described using the combinatorial notation C(5, 4)=5. Identifiers 320 (e.g., 320A-320E) may be used to represent these combinations by assigning a bit to each position in the shard set 350, and then using the resulting n-bit unsigned integer as the identifier in various embodiments. Thus, for example, the subset bitmap 10111, which represents the shard combination (311A, 311C, 311D, 312) may be assigned the unsigned integer value 23 as its ID, while the subset bitmap 11011, which represents shard combination (311A, 311B, 311D, 312) may be assigned the unsigned integer value 27 as its ID. In some embodiments, in order to retrieve a particular instance of the original data object, a request may include the ID of the corresponding subset. For example, in the scenario shown in FIG. 3, the logical equivalent of a submission of a "get (ObjectID=O1, GDUsetID=23)" request, where O1 is the object identifier, may result in the combination of (311A, 311C, 311D, 312) being used to generate the instance of the data object that is provided to the requester.

FIG. 4 illustrates an example 10:15 coding scheme which may be used for reconstituting a data object, according to at least some embodiments. In the depicted embodiment, Reed-Solomon erasure coding may be employed, in which arbitrarily many derived shards may be generated. In Reed-Solomon erasure coding, Galois Field arithmetic may be used; in at least some embodiments, the identity shards may be placed in the first k columns of an n-column matrix and the remaining n–k columns may be populated with derived data. An attractive property of the Reed-Solomon technique is that the matrix does not need to be fully materialized in order to be used. For example, in some embodiments, a 256-column matrix may be chosen to generate a 10:15 code. In this case only the leftmost 15 columns of the matrix may be used to regenerate the original data object with any 10-shard combination. Later, if additional derived shards are desired (e.g., to be able to provide a greater number of unique subsets/combinations), additional columns of the matrix may be generated as necessary.

In the 10:15 scheme depicted in FIG. 4, with 10 identity shards 411A-411J and 5 parity shards 412A-412E, the original data object can be recovered even if up to 5 shards are lost (e.g., due to storage device failures) and a 1.5× storage overhead is imposed (15/10). A 100:110 RS code would, in contrast, impose only a 1.1× overhead and survive the loss of any 10 shards. In some embodiments, the specific subset of shards that is to be used in reading a data object may not be exposed to the user or application requesting that data. Instead, the system may internally select an appropriate set of shards for reconstruction. In some embodiments, systems may elect to prefer reading identity shards (because they are less computationally expensive to reassemble), to choose nearby (or "local") shards close to the requester to avoid slow and costly network transfers, or to choose shards that are stored on less busy components of a storage subsystem. In other embodiments, a client may be permitted to select and/or specify a subset of shards to be used to fulfill a given request, or at least indicate a preference for a particular subset of shards to be used to fulfill a request. In at least some such embodiments, the system may algorithmically ensure that no two clients are allowed to read an instance reconstructed from the same subset of shards, thereby ensuring that the reconstructions are generated from unique underlying shard combinations for each client (or even for each request). Note that in an embodiment in which a client indicates a preference for a particular shard combination SCi, a DMDS may not necessarily be able to use SCi to provide a response (e.g., because some storage devices/ nodes used for SCi are unresponsive or unavailable, or because SCi has already been used for some other request and cannot be re-used given the applicable uniqueness requirements). In such a scenario, when a requested combination cannot be used, the DMDS may in some embodiments reject the request; in other embodiments, a different combination SCi that is available and that does meet applicable uniqueness criteria may be used.

A bitmap scheme similar to that introduced in the context of FIG. 3 may be used in the embodiment depicted in FIG. 4 to generate unique identifiers for different viable candidate shard subsets. Each bitmap may include ten "1"s and five "0"s. Three unique integer identifiers 1023 (ID 420A), 1535 (420B) and 1791 (420C), corresponding to bitmaps [00000 11111 11111], [00001 01111 11111], and [00001 10111 11111], respectively, are shown in FIG. 4 by way of example. The total number of unique combinations/subsets is C(15, 10) or 3003 in the depicted example scenario.

In applying coding schemes similar to that shown in FIG. 4 to create space-efficient object diversity, the target number of unique subsets of shards to be generated may have to be determined in various embodiments. This decision may be made based on a variety of factors for a given data object, such as the details of the uniqueness criteria, the expected popularity of the data object, client preferences indicated in a programmatic request, and so on. The parameters k and n may then be selected such that C(n, k) generates a sufficiently large set of unique shard sets. The effective logical storage represented by the resulting coded data is [size of the original data object]*C(n, k) this is the amount of data that would be stored if a complete copy of each data object were stored. The overhead relative to storing a single copy of the object, as mentioned above, is n/k.

For example, if an 11:49 coding were used in one embodiment, a total of C(49, 11) or about 29.1 billion unique shard sets would be available. In some embodiments, the identity shards may be excluded from the set of shards that is actually used for reconstructing the data object, e.g., if the application for which the data objects are being used has a requirement that only derived shards should be used. If the identity shards were eliminated from consideration in the C(49,11) example, the number of remaining available combinations would still be quite large (approximately 1.2 billion unique combinations, computed as C(n–k, k)=C(49–11, 11)=C(38, 11)). In both cases (regardless of whether the identity shards are used for reconstruction or not), the resulting overhead relative to storing the original data object is 49/11=about 4.546× the size of the original data object. In the scenario where the identity shards are retained for reconstruction, a total storage space that is about 6.5 billion times smaller than storing the 29.1 billion unique possible object copies would be required. In the second case of using only derived shards, a space reduction of about 270 million times may be achieved.

As mentioned above, in at least some embodiments in which Reed-Solomon or similar erasure coding techniques are used, all columns of the matrix of combinations need not be generated in advance. Thus, in one example scenario in which a matrix of as many as 256 columns may eventually be populated to represent the combinations/subsets of shards, initially only the first 11 columns may be used for identity shards and only 38 derived shards may be generated (making a total of 49 populated columns). If the list of available unique shard subset combinations is exhausted, the 50th column of the matrix may be generated, doubling the total number of available shard subsets, and such doubling may be repeated by populating more columns of the matrix as needed. To summarize, in embodiments in which techniques similar to that exemplified in FIG. 4 are used, a space-efficient repository of C(n, k) unique data objects may be stored with just an n/k space overhead.

As indicated in FIG. 4, new unique instances of the original data object may be assigned unique n-bit integers as identifiers, from the set of n-bit integers that have exactly k set bits. In at least some embodiments, generating the next thus-far-unused unique identifier in such a scenario may be referred to as a "same number of one bits" (SNOOB) counting problem. ID assignment may be provided using a function of the form "get_next_shard_subset_ID(n, k, last_used_ID)" in some embodiments, where the ID that was generated most recently is passed as the third parameter, and in which a SNOOB counter is utilized within the function. To obtain the very first unique ID, the last_used_ID parameter may be set to 0 when invoking such a function; the returned ID may be saved, and passed in as the last_used_ID parameter in the subsequent invocation.

Other approaches towards assigning unique identifiers to individual requests or requesters may be taken in some embodiments. In at least some embodiments, information about the requester of a data object instance (e.g., a client account identifier, an IP address from which the request for the instance is received, etc.) may be mapped (e.g., using a transformation function similar to a hash function) to an intermediary integer within an index range corresponding to an array of precomputed subset IDs. The values in the index range may each in effect act as a pointer to a unique ID—for example, in the scenario shown in FIG. 4, the ID at index [0] would be 1023, the ID at index [1] would be 1535, and so on. In some embodiments, a record of the particular shard subset ID used to respond to a request from a given client may be retained, so that, for example, if that same client requests the same data object again, the shard subset ID may be reused to reconstruct the data object instance.

Storing Copies of GDUs

Figure 5:
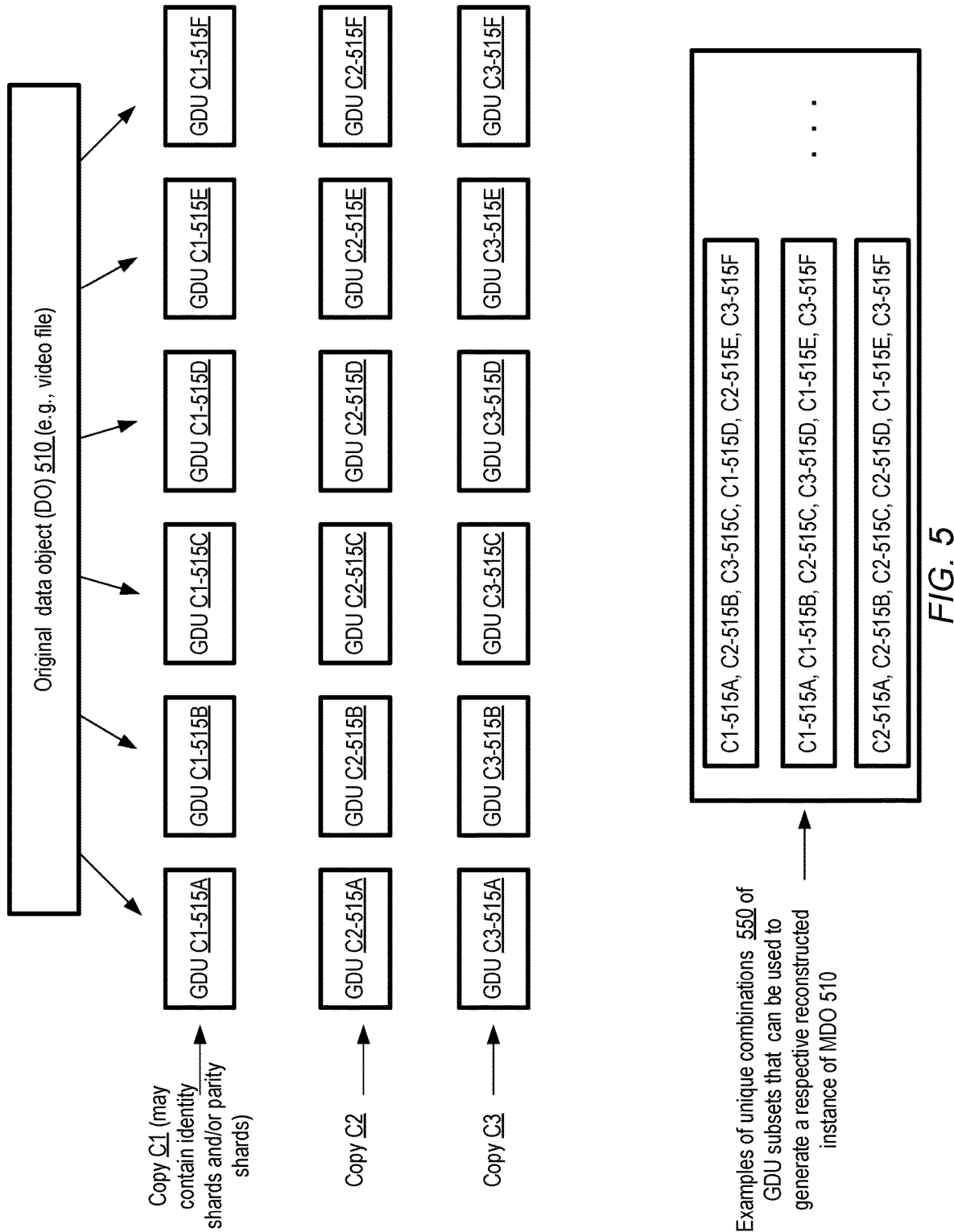
FIG. 5 illustrates an example technique in which multiple copies of individual shards of a data object may be generated and stored, according to at least some embodiments.

In several of the examples discussed above, such as those depicted in FIG. 3 and FIG. 4, only a single copy of a given GDU or shard was stored. FIG. 5 illustrates an example technique in which multiple copies of individual shards of a data object may be generated and stored, according to at least some embodiments. In the depicted example scenario, three copies C1, C2 and C3 of a set of GDUs derived from an original data object (DO) 510 may be stored. Copy C1 may, for example, comprise six GDUs C1-515A through C1-515F; copy C2 may comprise six GDUs C2-515A through C2-515F, and copy C3 may comprise six GDUs C3-515A through C3-515F. The data or bit sequence of corresponding GDUs (shown in the same column within FIG. 5) in the various copies may be identical in at least some embodiments—e.g., the bit sequences of C1-515A, C2-515A and C3-515A may be identical; similarly, the contents of C1-515D, C2-515D and C3-515D may be identical. In other embodiments, minor changes (e.g., a small selected number of bits) may be modified in each copy of a GDU—e.g., GDU C1-515A may differ slightly from GDU C2-515A and from C3-515A, to make the copies unique at the bit level relative to one another. Note that at least for some types of data objects such as videos or audios, introducing such small variations (e.g., on the order of a few bits in a megabyte) may not result in a perceptible difference to a consumer of the data item instances in some embodiments. The GDUs in copy-based configurations similar to that shown in FIG. 5 may comprise only identity shards in some embodiments; in other embodiments, each copy may comprise parity or derived shards as well as identity shards, or each copy may comprise only derived shards. The parameters governing such a copy-based configuration may include the total number and types of shards or GDUs per copy, as well as the number of copies.

To reconstruct an instance of the original data object 510 in the depicted embodiment, a combination of six GDUs, one from each of the six columns shown in FIG. 5, may be employed. As such, from among the set of copies of a given GDU, no more than one copy may be selected to reconstruct the instance, and the particular copy that is utilized may be selected based on a combination of factors such as proximity to the requester, the number of network transfers that may be required to assemble all the GDU copies to be used, and so on. Thus, possible viable unique GDU combinations 550 in the depicted embodiment may include, among others (C1-515A, C2-515B, C3-515C, C1-515D, C2-515E, C3-515F), (C1-515A, C1-515B, C2-515C, C3-515D, C1-515E, C3-515F), (C2-515A, C2-515B, C2-515C, C2-515D, C1-515E, C3-515F), and so on. In a scenario similar to that shown in FIG. 5, where each copy of C copies (C=3 in FIG. 5) has n shards (n=6) and the number of shards needed to reconstruct an instance of the object is also n, the total number of unique combinations possible is $C^n$. As a result, if each copy comprises a large number of GDUs (which is likely to be the case when the original object is relatively large such as a multi-gigabyte video), the number of unique viable combinations may be very high even with a relatively small number of copies. In some embodiments, e.g., in video-related or audio-related applications, the particular combination 550 that is to be used for a particular "play" request for the data item may not be decided until the play request is submitted. Such an approach, in which the GDU subset is not selected until shortly before the instance has to be provided to the requester, may be referred to as "late binding" of GDU subsets/combinations to requests in some embodiments. Individual combinations 550 may be referred to as "playlists" or "manifests" in some embodiments. In some embodiments, GDU combination-based techniques similar to those shown in FIG. 5 may be used in a manifest used for streamed data to create unique streams at the application level.

Example Programmatic Interactions

Figure 6:
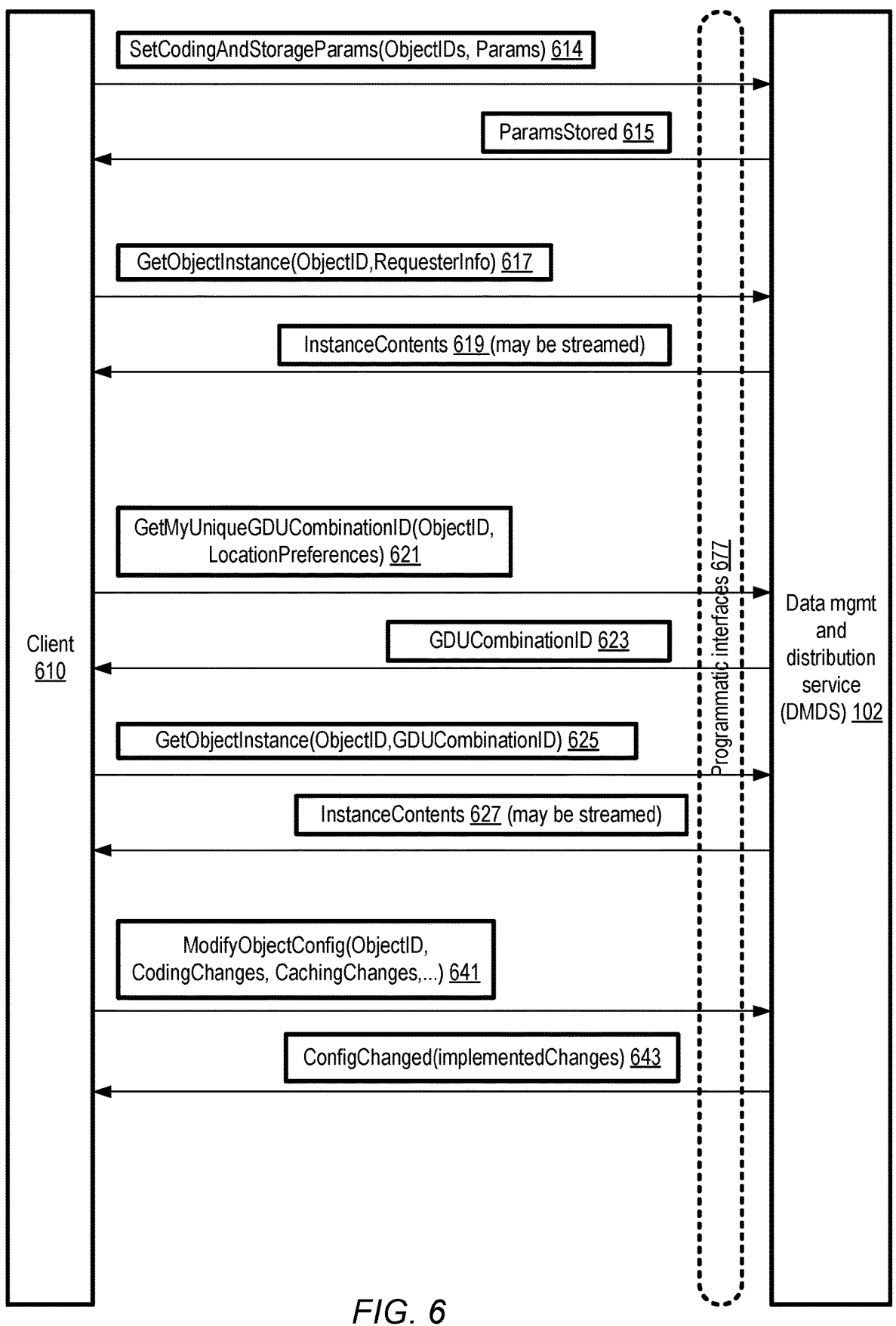
FIG. 6 illustrates example programmatic interactions between a client and a service which implements space-efficient techniques for generating unique instances of individual data objects for respective clients, according to at least some embodiments.

FIG. 6 illustrates example programmatic interactions between a client and a service which implements space-efficient techniques for generating unique instances of individual data objects for respective clients, according to at least some embodiments. As shown, a data management and distribution service (DMDS) 102 may implement a set of programmatic interfaces 677 in the depicted embodiment. The programmatic interfaces 677 may, for example, include a set of APIs, a web-based console, command-line tools and/or graphical user interfaces. Using the interfaces 677, clients 610 of at least two categories may submit programmatic requests to the DMDS, and receive corresponding replies. In some cases, the clients may be content intermediaries (such as video streaming services or the like), which use the DMDS to store and manage content that is eventually provided to end users of the intermediaries (e.g., consumers who wish to watch a video from a catalog of the intermediary). In other cases, the end users that desire access to data objects may directly interact with the DMDS via at least a subset of the interfaces 677.

A client 610 may, for example, submit a SetCodingAndStorageParams request 614, indicating a set of original data objects (referred to using the ObjectIDs parameter) and one or more parameters to be used for coding and storage of the GDUs/shards of the objects. The parameters may, for example, indicate the particular coding scheme or coding algorithm to be used, the uniqueness requirements for data object instances, logic to be used to decide how the GDUs of a given data object are to be distributed among storage nodes at the back end of the DMDS, at edge nodes, and/or at client-side devices, and so on. In some embodiments, the request 614 may indicate whether only derived GDUs (e.g., GDUs that are not identity shards, and cannot simply be concatenated to obtain the original data object) are to be used to reconstruct instances of the data objects. In at least one embodiment, instead of specifying identifiers of the data objects whose coding/reconstruction is going to be performed at the DMDS, a client may indicate a data source in a request similar to request 614, and the DMDS may in effect be requested to produce and store GDUs for reconstructing instances of some/all data objects from that data source. In at least one embodiment, an indication of the expected usage or demand of the data objects may be provided, e.g., as part of the SetCodingAndStorageParams request or at the times that individual data objects are stored, and such expected usage/demand information may be used to determine at least some of the coding parameters such as the number of GDUs to be generated. The DMDS may send a ParamsStored response message 615 in the depicted embodiment, acknowledging that the requested parameters have been stored in a metadata repository.

A number of different programmatic interactions may be supported for retrieving instances of data objects that are reconstructed using the shards/GDUs in different embodiments. For example, in some embodiments, a GetObjectInstance request 617 may include the ObjectID parameter (indicating the data object being requested), as well as implicit or explicit information about the requester (RequesterInfo) that can be used within the DMDS 102 to select the particular subset of GDUs to be used to reconstruct the instance to be provided to the client 610. A mapping function between the supplied RequesterInfo and the unique identifiers of the GDU subsets may be used in some embodiments to select the particular subset to be used to fulfil the request. In some embodiments, a SNOOB counter-based approach (similar to that described above, e.g., in the context of FIG. 4) may be used, in which case identification information of the requester may not necessarily be used as input to a GDU subset selection function. After an instance of the data object is reconstructed using a GDU subset, it may be returned to the requester in an InstanceContents response 619 or (e.g., for large data objects such as videos) streamed instead of being provided in a single response message. Thus, in the depicted embodiment, a client 610 need not necessarily supply a GDU combination or subset ID to retrieve a data object instance; instead, in at least some cases, the combination or subset to be used for the client may be identified within the DMDS itself (and the client may not even have to be aware of the existence of such identifiers, or even of the uniqueness constraints being enforced).

In another approach, a client 610 may first obtain a GDU combination ID from the DMDS 102, and then pass that ID as a parameter in a GetObjectInstance request 625. A GetMyUniqueGDUCombinationID request 621 may be submitted to obtain a unique combination ID in the depicted embodiment. Parameters to the request 621 may include, for example, the ObjectID of the data object, as well as optional location preferences in some embodiments. The location preferences may, for example, indicate that GDUs cached near the location of the requester should be preferred, or even indicate specific cities, states or countries from which the GDUs to be used for reconstructing the data object instance should preferably be obtained. Based on the preferences expressed by the client, and/or on internal policies or ID selection functions (including for example SNOOB-based functions of the kind discussed above) of the DMDS, a GDU combination that meets the uniqueness criteria for the data object may be identified for the requester at the DMDS, and the corresponding GDU combination identifier (e.g., similar to the unsigned integer IDs 420 shown in FIG. 4) may be provided in a message 623 to the client 610. That combination ID may be included in the GetObjectInstance request 625, and contents 627 of an instance of the data object reconstructed using the specific GDUs corresponding to the combination ID may be returned (or streamed) to the requesting client in the depicted embodiment. In at least one embodiment, some clients (such as content intermediaries) may be provided information about the locations of GDUs (and/or the costs of transmitting instances of the data object from various locations), and the clients may use the provided information to target or parameterize their requests (e.g., a client may direct a request to the closest or least-costly source of the GDUs). The extent to which metadata such as GDU subset identifiers, locations and the like is shared with clients may vary in different embodiments. In one embodiment, instead of or in addition to programmatically providing instances of requested object, the DMDS may provide a set of GDUs that can be combined by the requester to generate an instance of the object. For example, the equivalent of s "GetGDUCombination( )" or "GetGDUCombination(GDUCombinationID)" request may be submitted by a client to obtain a combination of GDUs from which the instance of the object may be reconstructed.

In at least one embodiment, a client 610 may request modifications to the configuration of a data object or set of objects, such as by submitting a ModifyObjectConfig request 641 via programmatic interfaces 677. The parameters of such a request may, for example, include one or more object identifiers (ObjectID), coding changes (e.g., changes to n or k parameters of the coding algorithm used to generate the GDUs from the object(s)), caching-related changes (e.g., requests to cache one or more GDUs at edge devices and/or client-side devices) and so on. The DMDS may attempt to make the requested changes, and send an acknowledgement message 642 indicating the changes that have been implemented in response to the ModifyObjectConfig request 641 in the depicted embodiment, A ModifyObjectConfig message may be used in some embodiments to expand the number of populated columns of an erasure coding matrix, e.g., to increase the available set of unique GDU subsets as discussed earlier. It is noted that at least in some embodiments, programmatic requests other than those shown in FIG. 6 may be supported by the DMDS, or one or more of the types of requests indicated in FIG. 6 may not be supported.

Provider Network Environment

Figure 7:
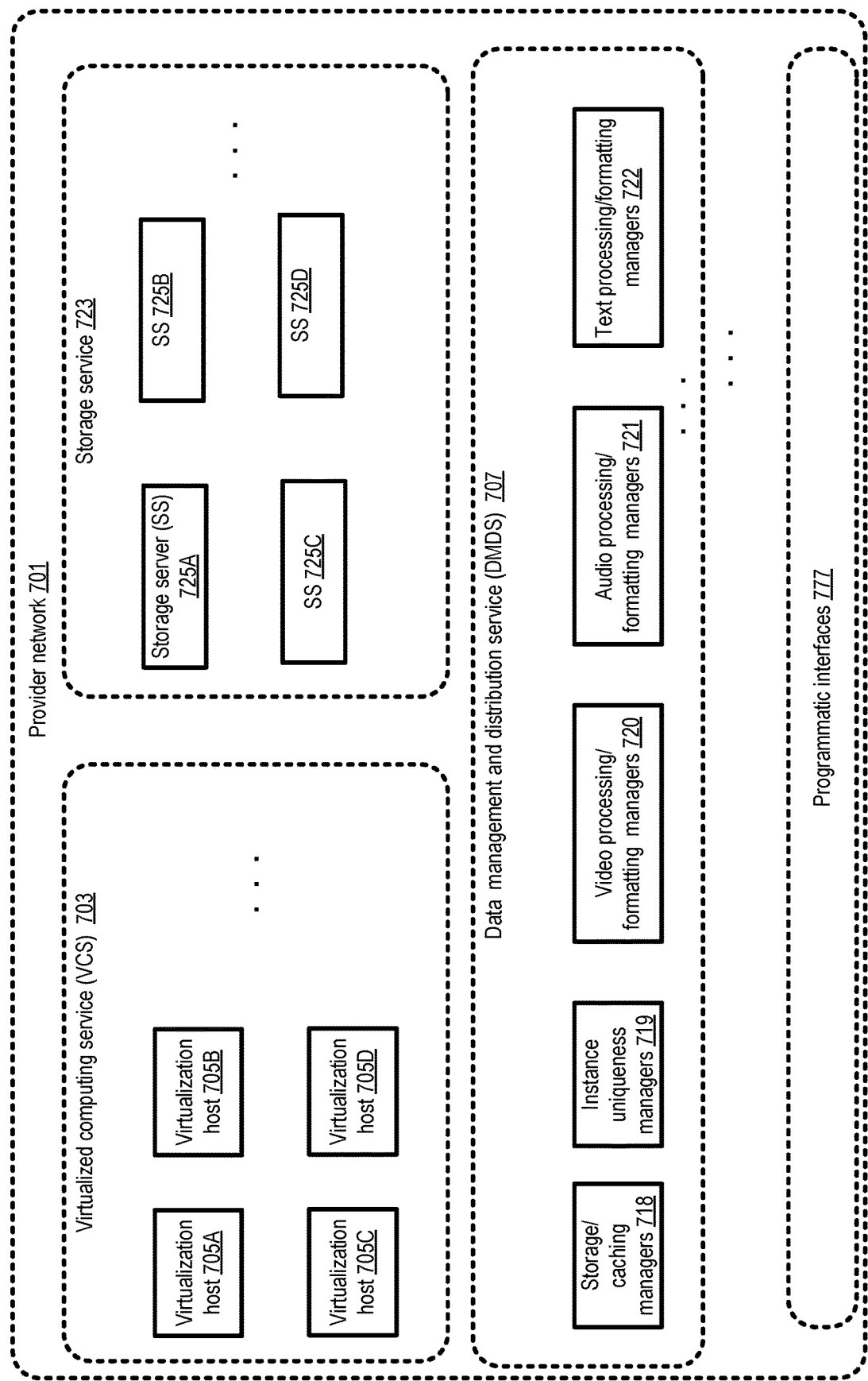
FIG. 7 illustrates an example provider network environment in which a data management and distribution service may be implemented, according to at least some embodiments.

In some embodiments, a DMDS may be implemented as part of a suite of network-accessible services. FIG. 7 illustrates an example provider network environment in which a data management and distribution service may be implemented, according to at least some embodiments. Networks set up by an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries). In at least some embodiments, some resources of the provider network may be located in edge locations, e.g., within premises which may be physically closer and/or closer in network distance to clients than at least some of the data centers at which substantial portions of various network-accessible services of the provider network are implemented.

The services implemented at provider network 701 in the depicted embodiment may include, for example, a virtual computing service (VCS) 703, one or more storage service(s) 723, and a DMDS 707 (similar in functionality and features to DMDS 102 of FIG. 1). The VCS 703 may comprise a plurality of virtualization hosts 705 (e.g., 705A-705D), at which compute instances of various types may be instantiated for use by VCS clients in the depicted embodiment. Storage service 723 may comprise a plurality of storage servers 725 (e.g., 725A-725D), at which data objects of various types may be stored on behalf of clients in various embodiments. In at least one embodiment, a storage service 723 may allow users to store unstructured data objects of arbitrary size, which can be retrieved using web services interfaces.

The DMDS 707 may include, for example, one or more storage/caching managers 718, instance uniqueness managers 719, video processing/formatting managers 720, audio processing/formatting managers 721, and/or text processing/formatting managers 722 in the depicted embodiment. The processing/formatting managers 720, 721 and or 722 may be utilized, for example, for converting data objects of a given type from one storage format to another, or for object processing tasks such as compression/decompression/encryption/decryption and the like. The instance uniqueness managers 719, which may be implemented using one or more computing devices, may be responsible for parameterizing and executing coding schemes for various algorithms of the kind discussed above (e.g., algorithms 106 of FIG. 1). The storing/caching managers 718 may be responsible for deciding the particular storage devices/nodes at which various GDUs corresponding to data objects being managed at the DMDS should be stored. In some cases, one or more of the subcomponents of the DMDS 707 may utilize resources of other provider network services—e.g., the logic of the storage/caching managers 718 and/or the instance uniqueness managers 719 may be executed at computing resources of the VCS 703, storage servers of the storage service 723 may be used for storing GDUs, and so on. As mentioned above, the resources of various services of a provider network may be geographically distributed; as a result, it may be the case in at least some embodiments that respective combinations of GDUs that can be used to reconstruct an object instance Obj1 are available in several different locations such as L1, L2 or L3. The network latencies for accessing a given amount of data at a given DMDS client device from L1, L2 or L3 may differ substantially. In some such scenarios, proximity of the available GDU combinations may be taken into account when determining which particular GDU combination should be used to respond to a particular client request.

Individual ones of the services of provider network 701 may expose respective sets of programmatic interfaces 777 to its clients in the depicted embodiment. In general (as in the case of the DMDS, which may use the VCS and/or the storage service 723 as described above) several of the services may utilize resources of other services. As such, various services of provider network 702 may act as clients of other services, and may utilize the programmatic interfaces of the other services in the depicted embodiment. In some embodiments, at least some of the techniques discussed above for space efficient generation of unique instances of data objects may be implemented without acquiring resources of network-accessible services such as those shown in FIG. 7.

Figure 8:
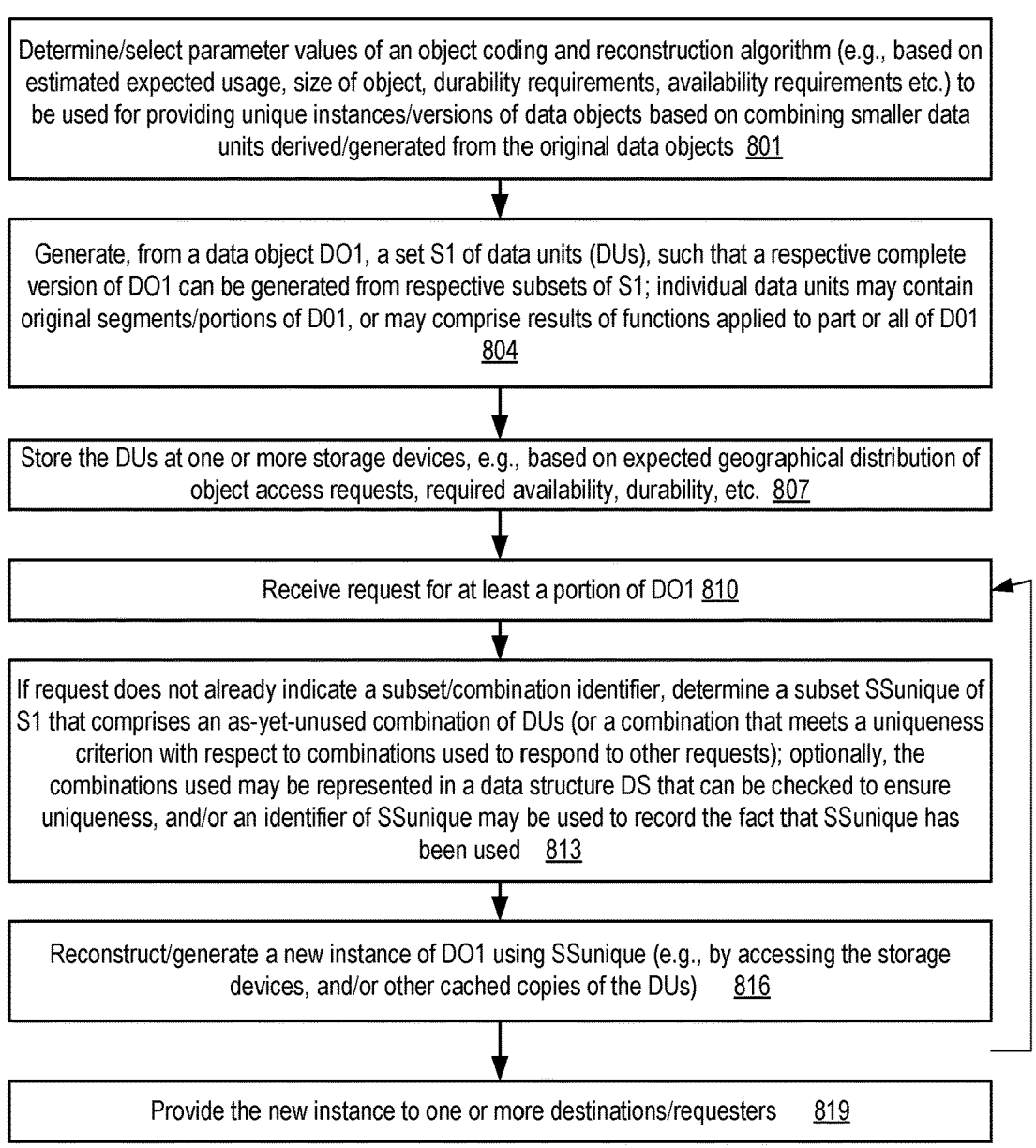
FIG. 8 is a flow diagram illustrating aspects of operations that may be performed to implement space-efficient techniques for generating unique instances of data objects, according to at least some embodiments.

Methods for Space-Efficient Techniques to Provide Unique Instances of Data Objects FIG. 8 is a flow diagram illustrating aspects of operations that may be performed to implement space-efficient techniques for generating unique instances of data objects, according to at least some embodiments. As shown in element 801, values of a set of parameters of an object coding and reconstruction algorithm to be used to provide unique instances/versions of data objects based on combining smaller data units derived/generated from the original data objects may be selected or determined in the depicted embodiment, e.g., at a data management and delivery service of the kind discussed above. Such parameter values may include, for example, settings for the "k" and "n" parameters of the coding schemes/algorithms discussed earlier, storage device selection parameters (used to identify particular storage nodes or devices at which a given data unit should to be stored), and so on. One or more of the parameter values may determine whether only derived GDUs (which cannot simply be concatenated to reconstitute an instance of the data object) are to be used for instance reconstruction. A number of factors may influence the selection of the parameter values in different embodiments, such as the estimated/expected usage or demand (the number of consumers/requesters for individual data objects of the object collection being managed, or the rate at which requests for the data objects are expected during some interval), the size of the data objects, durability/availability requirements, geographical distribution requirements (e.g., to enable requests for the data objects to be served quickly in various geographical locations) and so on. In at least some embodiments, clients on whose behalf the data objects are to be stored and/or distributed may indicate one or more parameter values. In one embodiment, meta-parameter values such as the particular type of coding algorithm to be used for a given set of data objects or a category of data items may also be selected.

From a data object DO1, a set S1 of data units (DUs) may be derived/generated in various embodiments using the parameters, such that a respective complete instance of DO1 may be generated using subsets of S1 (element 804). The data units may be referred to as shards, segments or sections in some embodiments. A given data unit may contain original contents of a portion of DO1 (in which case the data unit may sometimes be referred to as an "identity shard" or "identity segment"), or may be generated by applying a function to at least a portion of DO1 (in which case the data unit may be referred to as a "parity shard" or a "derived shard").

The generated data units of set S1 may be stored at one or more storage devices, e.g., at one or more storage nodes of a DMDS, in various embodiments (element 807). The particular storage devices or nodes may be selected based on various factors, including for example a desired geographical distribution, data object availability requirements, durability requirements etc. Depending on the parameters selected for the coding algorithm, the total amount of storage space used for the generated data units may be much smaller the product of (a) the size of the original data object DO1 and (b) the total number of instances of DO1 that are eventually reconstructed and provided to DMDS clients using the generated data units. For example, as mentioned in the context of FIG. 4, in an embodiment in which an 11:49 coding scheme is used, as many as 29 billion unique instances may be reconstructed and provided to clients while using less than ten times the space required for the original data object.

A request for at least a portion of DO1 may be received (element 810), e.g., via a programmatic interface of a DMDS. If the request does not already indicate a subset/combination identifier, a subset SSunique of S1 that comprises an as-yet-unused combination of DUs (or a combination that meets a uniqueness criterion with respect to combinations that may have been used to respond to other requests) may be identified in the depicted embodiment (element 813). If the uniqueness criterion requires that a given subset of S1 be used no more than once, for example, the DMDS may verify, before using the SSunique subset to respond to the request, that SSunique has not been used to respond to any other request. For example, in some embodiments, a SNOOB counter of the kind discussed earlier may be used to determine SSunique. Optionally, the combinations used for various requests may be represented in a data structure DS that can be checked to ensure uniqueness (and/or to re-use a particular combination of DUs for a repeat request from the same requester). In at least one embodiment, an identifier of SSunique (similar to the bitmaps or corresponding unsigned integers shown in FIG. 3 or FIG. 4) may be stored in a record indicating that the corresponding combination of DUs has been used, e.g., to ensure that the same combination is not used again.

A new instance of DO1 may be generated using the SSunique subset in various embodiments, in accordance with the coding algorithm being used (element 816). The SSunique data units may be read in from the storage devices at which they were stored, and/or from other cached copies in various embodiments. The new instance may be transmitted or provide to one or more destinations (e.g., to the requester of the data object, and/or to some other destination indicated in the request) (element 819). As and when additional requests for the same data object and/or other data objects are received, operations corresponding to elements 810 onwards may be performed in the depicted embodiment. Note that in at least some embodiments, one or more of the parameters governing the generation/storage of data units and the reconstruction of the data object instances from the data units may be dynamically modified—e.g., additional derived shards may be generated as discussed earlier in response to indications or metrics of increased demand for the data object. Such additional shards may then be used (e.g., in combination with some of the originally-generated shards, or without utilizing the originally-generated shards) to reconstruct additional instances of the data object. In one embodiment, the number of shards that is stored may be decreased in response to reduced demand.

It is noted that in various embodiments, at least some operations other than those illustrated in the flow diagram of FIG. 8 may be used to implement the techniques described above. Some of the operations shown may not be implemented in some embodiments or may be implemented in a different order, or in parallel rather than sequentially.

Illustrative Computer System

Figure 9:
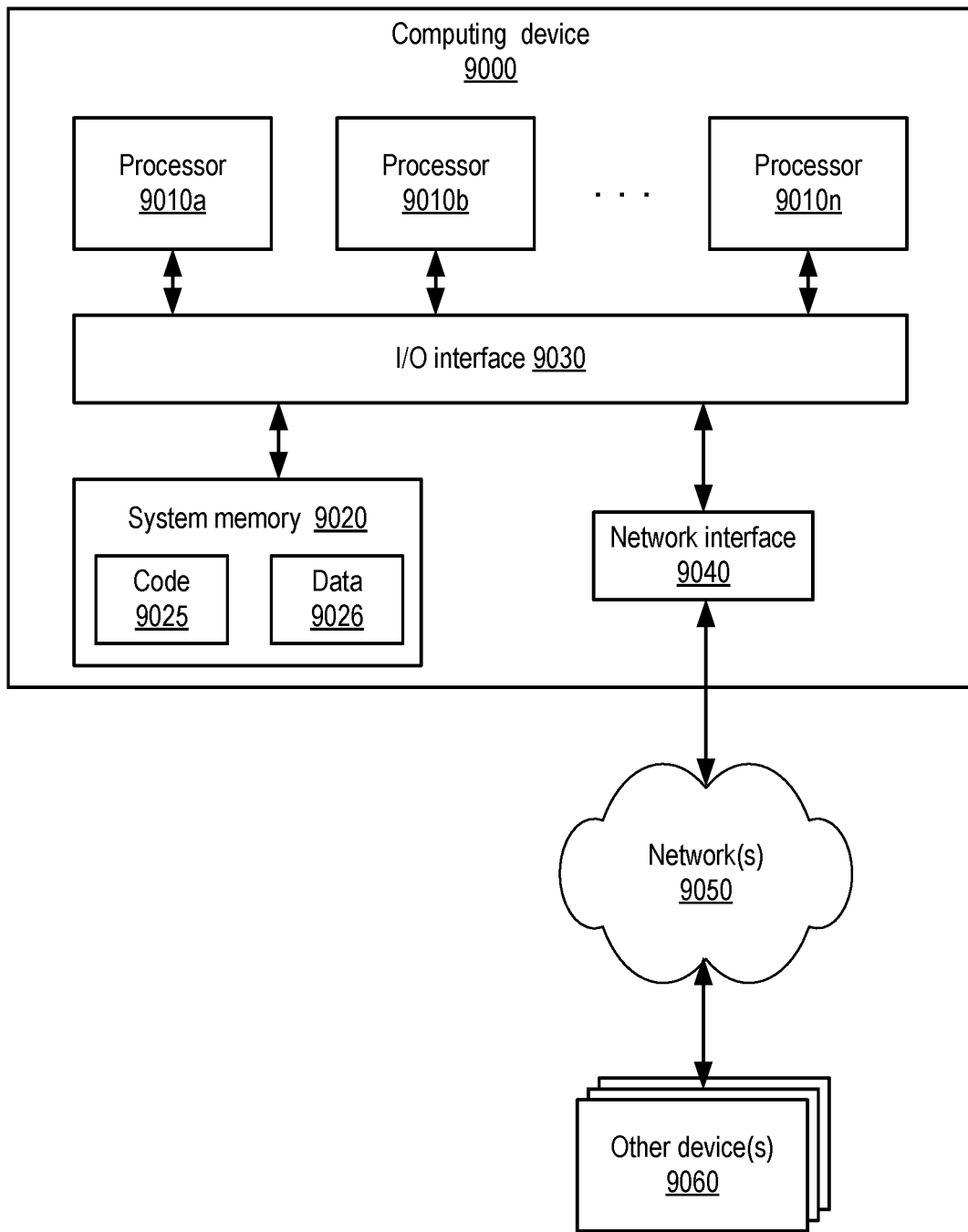
FIG. 9 is a block diagram illustrating an example computing device that may be used in at least some embodiments.

In at least some embodiments, a server that implements a portion or all of one or more of the technologies described herein, including the various tasks associated with generating and storing/caching data units derived from data objects using coding algorithms, reconstructing instances of the data objects from subsets of the data units and transmitting them to destinations, and/or various other features of a data management and distribution service may include a general-purpose computer system that includes or is configured to access one or more computer-accessible media. FIG. 9 illustrates such a general-purpose computing device 9000. In the illustrated embodiment, computing device 9000 includes one or more processors 9010 coupled to a system memory 9020 (which may comprise both non-volatile and volatile memory modules) via an input/output (I/O) interface 9030. Computing device 9000 further includes a network interface 9040 coupled to I/O interface 9030. In at least some embodiments computing device 9000 may include a motherboard to which some or all of such components may be attached.

In various embodiments, computing device 9000 may be a uniprocessor system including one processor 9010, or a multiprocessor system including several processors 9010 (e.g., two, four, eight, or another suitable number). Processors 9010 may be any suitable processors capable of executing instructions. For example, in various embodiments, processors 9010 may be general-purpose or embedded processors implementing any of a variety of instruction set architectures (ISAs), such as the x86, PowerPC, SPARC, or MIPS ISAs, or any other suitable ISA. In multiprocessor systems, each of processors 9010 may commonly, but not necessarily, implement the same ISA. In some implementations, graphics processing units (GPUs) may be used instead of, or in addition to, conventional processors.

System memory 9020 may be configured to store instructions and data accessible by processor(s) 9010. In at least some embodiments, the system memory 9020 may comprise both volatile and non-volatile portions; in other embodiments, only volatile memory may be used. In various embodiments, the volatile portion of system memory 9020 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 9020 as code 9025 and data 9026.

In one embodiment, I/O interface 9030 may be configured to coordinate I/O traffic between processor 9010, system memory 9020, and any peripheral devices in the device, including network interface 9040 or other peripheral interfaces such as various types of persistent and/or volatile storage devices. In some embodiments, I/O interface 9030 may perform any necessary protocol, timing or other data transformations to convert data signals from one component (e.g., system memory 9020) into a format suitable for use by another component (e.g., processor 9010). In some embodiments, I/O interface 9030 may include support for devices attached through various types of peripheral buses, such as a variant of the Peripheral Component Interconnect (PCI) bus standard or the Universal Serial Bus (USB) standard, for example. In some embodiments, the function of I/O interface 9030 may be split into two or more separate components, such as a north bridge and a south bridge, for example. Also, in some embodiments some or all of the functionality of I/O interface 9030, such as an interface to system memory 9020, may be incorporated directly into processor 9010.

Network interface 9040 may be configured to allow data to be exchanged between computing device 9000 and other devices 9060 attached to a network or networks 9050, such as other computer systems or devices as illustrated in FIG. 1 through FIG. 8, for example. In various embodiments, network interface 9040 may support communication via any suitable wired or wireless general data networks, such as types of Ethernet network, for example. Additionally, network interface 9040 may support communication via telecommunications/telephony networks such as analog voice networks or digital fiber communications networks, via storage area networks such as Fibre Channel SANs, or via any other suitable type of network and/or protocol.

In some embodiments, system memory 9020 may be one embodiment of a computer-accessible medium configured to store program instructions and data as described above for FIG. 1 through FIG. 8 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 9000 via I/O interface 9030. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 9000 as system memory 9020 or another type of memory. In some embodiments, a plurality of non-transitory computer-readable storage media may collectively store program instructions that when executed on or across one or more processors implement at least a subset of the methods and techniques described above. A computer-accessible medium may include transmission media or signals such as electrical, electromagnetic, or digital signals, conveyed via a communication medium such as a network and/or a wireless link, such as may be implemented via network interface 9040. Portions or all of multiple computing devices such as that illustrated in FIG. 9 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
one or more computing devices;
wherein the one or more computing devices include instructions that upon execution on or across one or more processors cause the one or more computing devices to:
obtain an indication of an expected demand for a data object to be accessed via a network;
generate, from the data object, a first set of data units, wherein using the first set of data units respective unique instances of the data object can be reconstructed from respective subsets of the first set of data units, and wherein the number of data units generated is based at least in part on the expected demand;
store the first set of data units at one or more storage devices;
identify, corresponding to a first request for at least a portion of the data object, a first subset of the first set, wherein the first subset meets a uniqueness criterion for reconstructing an instance of at least a portion of the data object with respect to other subsets of the first set that are used to respond to other requests for at least the portion of the data object, wherein the uniqueness criterion comprises a requirement that respective members of the first subset and respective members of respective ones of the other subsets differ one to another by at least one data unit of the first set of data units;
reconstruct a first instance of at least the portion of the data object from the first subset, wherein the reconstruction comprises accessing at least one storage device of the one or more storage devices; and
cause the first instance to be provided to one or more requestors.

2. The system as recited in claim 1, wherein to identify that the first subset meets the uniqueness criterion, the one or more computing devices include further instructions that upon execution on or across one or more processors further cause the one or more computing devices to:
verify that the first subset has not been used to respond to any other request.

3. The system as recited in claim 1, wherein the one or more computing devices include further instructions that upon execution on or across one or more processors further cause the one or more computing devices to:

cause a plurality of instances of the data object to be provided to a plurality of requesters, wherein individual ones of the plurality of instances are reconstructed from respective subsets of the first set, and wherein the amount of storage to store the first set at the one or more storage devices is smaller than the product of (a) the size of the data object and (b) the total number of provided instances.

4. The system as recited in claim 1, wherein the one or more computing devices include further instructions that upon execution on or across the one or more processors further cause the one or more computing devices to:
in response to obtaining an indication of an increase in demand of the data object, generate one or more additional data units from the data object after the first set of data units has been stored; and
reconstruct a second instance of at least a portion of the data object using at least one additional data unit of the one or more additional data units.

5. The system as recited in claim 1, wherein the first set of data units comprises a plurality of copies of a first data unit, and wherein the first subset comprises no more than one copy of the plurality of copies of the first data unit.

6. A method, comprising:
performing, at one or more computing devices:
generating, from a data object, a first set of data units, wherein using the first set of data units respective unique instances of the data object can be reconstructed from respective subsets of the first set of data units;
storing the first set of data units generated from a data object;
identifying, corresponding to a first request for at least a portion of the data object, a first subset of the first set, wherein the first subset meets a uniqueness criterion for reconstructing an instance of at least a portion of the data object with respect to other subsets of the first set that are used to respond to other requests for at least the portion of the data object, wherein the uniqueness criterion comprises a requirement that respective members of the first subset and respective members of respective ones of the other subsets differ one to another by at least one data unit of the first set of data units; and
providing a first instance of at least the portion of the data object, wherein the first instance is reconstructed from the first subset.

7. The method as recited in claim 6, further comprising performing, at the one or more computing devices:
generating the first set of data units using a coding algorithm, wherein the coding algorithm comprises one or more of: a Reed-Solomon erasure-coding algorithm, an XOR (exclusive OR) based coding algorithm, a network coding algorithm, or a Mojette coding algorithm.

8. The method as recited in claim 6, further comprising performing, at the one or more computing devices:
generating the first set of data units using a coding algorithm, wherein one or more parameters associated with the coding algorithm are selected based at least in part on one or more of: (a) an expected demand for the data object, (b) a size of the data object, (c) an availability requirement, (d) a data durability requirement, or (e) a geographical distribution requirement.

9. The method as recited in claim 6, further comprising performing, at the one or more computing devices:
subdividing the data object into a plurality of segments, wherein the first set of data units includes at least one segment of the plurality of segments.

10. The method as recited in claim 6, further comprising performing, at the one or more computing devices:
subdividing the data object into a plurality of segments;
generating, using one or more transformation functions, a plurality of derived data units from the plurality of segments, such that the data object cannot be reconstructed by concatenating derived data units, wherein the first set of data units (a) includes one or more derived data units and (b) does not include segments of the plurality of segments.

11. The method as recited in claim 6, further comprising performing, at the one or more computing devices:
generating unique identifiers of respective subsets of the first set, including a first unique identifier of the first subset; and
storing, as an indicator that the first subset was used to respond to the first request, at least the unique identifier.

12. The method as recited in claim 11, further comprising performing, at the one or more computing devices:
assigning, to individual ones of the data units of the first set, a respective position within a bitmap, wherein the generating of the unique identifiers comprises utilizing a bitmap in which entries assigned to the data units of the first subset are set to a selected value.

13. The method as recited in claim 6, wherein at least some data units of the first subset are stored at an edge device of a data distribution service.

14. The method as recited in claim 6, further comprising performing, at the one or more computing devices:
providing, via a programmatic interface in response to a first request from a client of a data distribution service, an identifier of a second subset of the first set, wherein a second instance of at least a portion of the data object can be reconstructed from the second subset; and
generating, in response to a second request which includes the identifier, the second instance.

15. The method as recited in claim 6, wherein the data object comprises at least a portion of one or more of: (a) a video, (b) an audio recording, or (c) a text file.

16. One or more non-transitory computer-accessible storage media storing program instructions that when executed on or across one or more processors cause one or more computer systems to:
generate, from a data object, a first set of data units, wherein using the first set of data units respective unique instances of the data object can be reconstructed from respective subsets of the first set of data units;
store the first set of data units associated with the data object;
identify, corresponding to a first request for at least a portion of the data object, a first subset of the first set, wherein the first subset meets a uniqueness criterion for reconstructing an instance of at least a portion of the data object with respect to other subsets of the first set that are used to respond to other requests for at least the portion of the data object, wherein the uniqueness criterion comprises a requirement that respective members of the first subset and respective members of respective ones of the other subsets differ one to another by at least one data unit of the first set of data units; and
cause a first instance of at least the portion of the data object to be reconstructed from the first subset.

17. The one or more non-transitory computer-accessible storage media as recited in claim 16, storing further program instructions that when executed on or across one or more processors further cause the one or more computer systems to:
   generate the first set of data units using a coding algorithm, wherein the coding algorithm comprises one or more of: a Reed-Solomon erasure-coding algorithm, an XOR (exclusive OR) based coding algorithm, a network coding algorithm, or a Mojette coding algorithm.

18. The one or more non-transitory computer-accessible storage media as recited in claim 16, storing further program instructions that when executed on or across one or more processors further cause the one or more computer systems to:
   generate the first set of data units using a coding algorithm, wherein one or more parameters of the coding algorithm are selected based at least in part on one or more of: (a) an expected demand for the data object, (b) a size of the data object, (c) a reliability requirement, (d) an availability requirement, or (e) a geographical distribution requirement.

19. The one or more non-transitory computer-accessible storage media as recited in claim 16, storing further program instructions that when executed on or across one or more processors further cause the one or more computer systems to:
   subdivide the data object into a plurality of segments, wherein the first set of data units includes at least one segment of the plurality of segments.

20. The one or more non-transitory computer-accessible storage media as recited in claim 16, storing further program instructions that when executed on or across one or more processors further cause the one or more computer systems to:
   subdivide the data object into a plurality of segments;
   generate, using one or more transformation functions, a plurality of derived data units from the plurality of segments, wherein the first set of data units (a) includes one or more derived data units and (b) does not include segments of the plurality of segments.

* * * * *